UNITED STATES PATENT OFFICE.

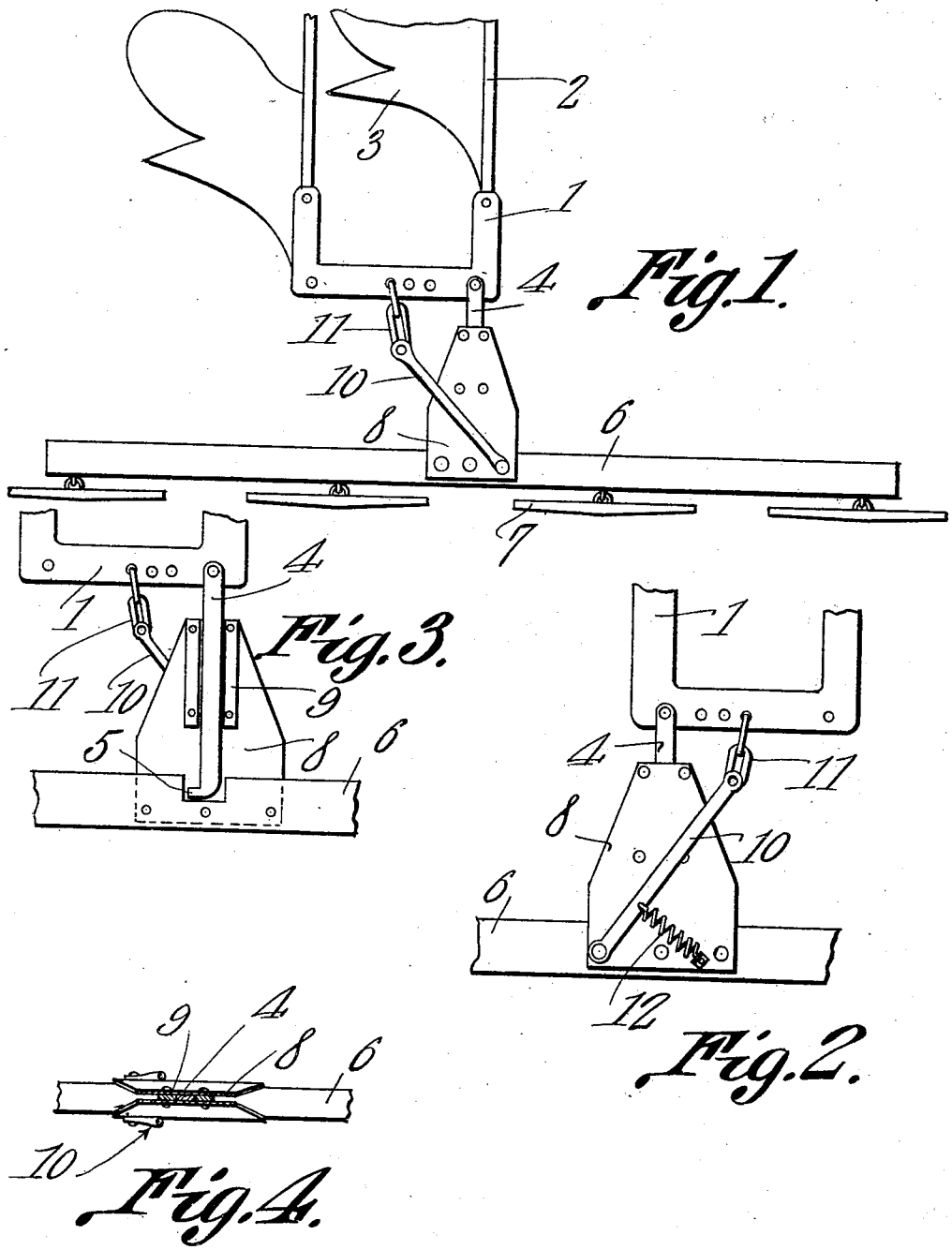

JOHN CUNNINGHAM, OF EASTON, ILLINOIS.

PLOW DRAFT DEVICE.

977,436.  Specification of Letters Patent.  Patented Dec. 6, 1910.

Application filed March 25, 1910. Serial No. 551,474.

*To all whom it may concern:*

Be it known that I, JOHN CUNNINGHAM, a citizen of the United States, residing at Easton, in the county of Mason and State of Illinois, have invented a new and useful Plow Draft Device, of which the following is a specification.

This invention relates to a plow draft device and consists in the novel construction and arrangement of its parts as hereinafter shown and described.

The object of the invention is to provide a draft device to which draft animals are adapted to be attached and having its parts so arranged and disposed as to distribute the draft strain throughout a gang or series of beams carrying furrow openers.

With the above object in view the draft device consists of a draft bar to which swingle or double trees are attached. A clip is attached to the intermediate portion of the draft bar and a yoke is connected with the said clip by means of a pivoted arm and a pivoted link. The link is subjected to the tension of a spring mounted upon the clip and the tendency of the said spring is to hold the rear end of the link toward the draft bar. Consequently when stress is applied to the link the tendency is first to swing the rear end of the link in a rearward direction and inasmuch as the link is connected with the intermediate portion of the yoke the draft strain is first applied to the intermediate portion of the yoke. The positive stress however is communicated directly from the clip to the said yoke and thus the draft strain is distributed or applied to different portions of the yoke.

In the accompanying drawing:—Figure 1 is a plan view of the plow draft appliance. Fig. 2 is a bottom plan view of the same. Fig. 3 is a top plan view of the same with the upper portion of the clip removed. Fig. 4 is a transverse sectional view through the clip of the plow draft appliance.

The plow draft appliance comprises a yoke 1 which is secured at its end to the forward portions of beams 2 which in turn carry at their rear portions furrow openers 3. An arm 4 is pivoted at its rear end to the corner portion of the yoke 1 and is provided at its forward end with a laterally disposed shoulder 5. A draft bar 6 is located in advance of the yoke 1 and is provided with a series of swingle or double trees 7. A clip 8 is mounted upon the intermediate portion of the draft bar 6 and is provided between its inner sides with parallel blocks 9 which snugly receive between them the intermediate portion of the pivoted arm 4. A link 10 is pivoted at its forward end to the draft bar 6 and preferably a corner portion of the clip and the rear end of the link 10 is pivotally connected with the intermediate portion of the yoke 1 by means of a series of links 11. A spring 12 is fixed at one end to the under portion of the clip 8 and the opposite end of the said spring is connected with the intermediate portion of the link 10. The spring 12 is under tension with the tendency to hold the rear end portion of the link 10 toward the draft bar 6. Such being the case and in view of the description it will be seen that when draft strain is applied to the bar 6 that upon the initial forward movement of the clip 8 the spring 12 will be elongated and therefore the initial draft strain will be applied to the intermediate portion of the yoke 1 through the said link 10 and the connecting links 11. As the said draft strain is continued the arm 4 will move longitudinally between the blocks 9 and eventually the laterally disposed shoulder 5 of the arm 4 will engage the forward end of one of the blocks 9 when the said arm will become fixed with relation to the block and positive forward draft strain is applied through the said arm to the yoke 1. By reason of the fact that the clip 8 is attached to the draft bar 6 at a point approximately intermediate the ends thereof and the arm 4 is in alinement with the innermost beam 2 it will be seen that if four draft animals are attached to the draft beam 6 that at least three of them may travel upon the unbroken surface of the ground while the fourth animal may travel in the furrow previously opened. At the same time notwithstanding the fact that animals are connected with the series of beams in the manner indicated the draft strain will be approximately evenly divided between the beams 2 by reason of the fact that the link 10 extends diagonally from the clip 8 to the intermediate portion of the yoke 1 and its rear end portion is held under spring tension toward the draft beam 6.

Having described the invention what I claim as new and desire to secure by Letters Patent is:—

1. A plow draft appliance comprising a yoke adapted to be connected with a series of beams, an arm pivotally connected at its rear end with one end portion of the yoke, a clip slidably mounted upon said arm, means for limiting the sliding movement of the arm with relation to the clip, a draft beam attached to the clip, a link pivoted at its forward end to the beam, a spring attached to the beam and connected with said link and under tension with a tendency to hold the rear end of the link toward the beam and a series of links connecting the rear end of the first said link with the intermediate portion of said yoke.

2. A plow draft device comprising a yoke having rearwardly disposed end portions adapted to be connected with a series of plow beams, and an arm pivotally connected at its rear end to a corner portion of the yoke and having a laterally disposed shoulder formed at its forward end, a clip slidably mounted upon said arm and provided with means for limiting the sliding movement upon the arm, a draft beam attached to the forward end of the clip, a link pivotally connected at its forward end with the draft beam, a traction spring attached at one end to the beam and connected at its other end with the link and under tension with a tendency to hold the rear end of the link toward the said beam, and links pivotally connecting the rear end of said link with the intermediate portion of the said yoke.

In testimony that I claim the foregoing as my own, I have hereto affixed my signature in the presence of two witnesses.

JOHN CUNNINGHAM.

Witnesses:
  E. N. FURRER,
  A. FURRER.